United States Patent [19]

Tsuzurahara

[11] Patent Number: 4,872,085
[45] Date of Patent: Oct. 3, 1989

[54] THROUGH-TYPE CAPACITOR WITH IMPROVED ANTI-TRACKING PERFORMANCE

[75] Inventor: Mamoru Tsuzurahara, Mobara, Japan

[73] Assignee: Hitachi, Ltd., Tokyo, Japan

[21] Appl. No.: 200,065

[22] Filed: May 27, 1988

[30] Foreign Application Priority Data

Jun. 5, 1987 [JP] Japan ............................ 62-139736
Jun. 26, 1987 [JP] Japan ............................ 62-157637

[51] Int. Cl.$^4$ .................................................. H01G 3/28
[52] U.S. Cl. ......................................................... 361/302
[58] Field of Search ............... 361/302, 306 R, 321 T; 252/570

[56] References Cited

U.S. PATENT DOCUMENTS 3,808,478 4/1974 Winkler ............................... 361/302
4,351,880 9/1982 Fukui et al. ..................... 361/306 R
4,490,496 12/1984 Maekawa et al. .................. 252/570

FOREIGN PATENT DOCUMENTS 104446 6/1982 Japan .

*Primary Examiner*—Donald Griffin
*Attorney, Agent, or Firm*—Antonelli, Terry & Wands

[57] ABSTRACT

A through-type capacitor with an improved anti-tracking characteristic is disclosed. A central conductor to be applied with a high voltage is fitted through the center of a dielectric member. An electrode is plated on the outer peripheral part of the dielectric member. An earth electrode is connected by solder with the electrode on the outer peripheral part. An armor case of insulating material is inserted into the earth electrode and surrounds the dielectric member. An insulating resin is filled in a space between the armor case and the dielectric member. The surfaces including the forward end of the armor case are coated with an anti-tracking resin film.

4 Claims, 1 Drawing Sheet

THROUGH-TYPE CAPACITOR WITH IMPROVED ANTI-TRACKING PERFORMANCE

BACKGROUND OF THE INVENTION

The present invention relates to an improved construction, of a through-type capacitor, and more particularly to a through-type capacitor having an improved anti-tracking performance suitable as a capacitor for use with a high-frequency filter of the magnetron.

A construction of the through-type capacitor used for the filter of the magnetron is disclosed in JP-U-57-104446 filed for utility model registration in Japan by Tokyo Shibaura Electric Co., Ltd. on Dec. 18, 1980. In the magnetron which is adapted for oscillation with high frequencies, part of the fundamental oscillation electric wave or it's high harmonics is liable to leak outside through power lines. In order to prevent this inconvenience, it is common practice to insert a high-frequency cut-off filter in the line connecting the magnetron and a power supply. The filter is normally configured of a choke coil and a through-type capacitor with an earth electrode thereof connected to a filter case. Since the magnetron has an anode thereof impressed with a voltage of several thousand volts, the same voltage is applied between the central electrode and the earth electrode of the through-type capacitor of the filter.

In the case where the surface of the armor case of insulating material of the through capacitor impressed with such a high voltage is contaminated with dust, salt, carbon, fine metal powder or the like, a leakage current flows on the surface thereof, and the resulting heat generation forms a partial dry zone where the leakage current is cut off. Most of the applied voltage is concentrated to generate a spark discharge at the cut-off portion. The discharge, in turn, carbonizes the surface of the insulating material, which thus forms a conductive path finally to cause a dielectric breakdown. This phenomenon is called "the tracking". The tracking phenomenon is described, for instance, in "Electrical Insulating Materials" pp. 165 to 169, by Tatsunosuke Ashizawa, published by Sangyo Tosho Co., Ltd. in Japan on October 30, 1969. Also, with regard to the insulating material for the armor case of the through-type capacitor, the use of polybutylene terephthalate (PBT) is disclosed in JP-Y2-60-18832, JP-U-63-16427 and JP-U-63-20421 field in Japan by TDK Co., Ltd. on Jan. 19, 1980, July 16, 1986 and July 24, 1986, respectively. The PBT material is flexible and resistant to external shocks, and if used for an armor case of a through-type capacitor, is hard to break while being easily fitted with the earth electrode plate of the capacitor. Further, it has a comparatively high anti-tracking performance.

A tracking is liable to occur if the surface of the through-type capacitor is contaminated during the processes of production or use or if moisture attaches to the surface of the through-type capacitor while being used in an environment subjected to great changes in humidity or temperature. Also, the chance of surface discharge increases with the size reduction of the through-type capacitor which is one of the electronic parts required to be miniaturized. The PBT material which is an organic material, therefore, may develop a tracking if used as an armor case of a through-type capacitor under such environmental conditions as mentioned above. This phenomenon has been confirmed in a test conducted by applying a high voltage periodically between the electrodes of a through-type capacitor in a high-humidity environment.

SUMMARY OF THE INVENTION

The object of the present invention is to provide a reliable through-type capacitor adapted for miniaturization which rarely develops a tracking even under adverse environmental conditions.

In order to achieve this object, there is provided according to the present invention a through-type capacitor in which the surface of an armor case is coated with a film of a material high in anti-tracking performance such as insulating material of epoxy resin, and the forward end corners of the armor case are processed into smooth surfaces on which a resin film high in tracking property is coated. A through-type capacitor of this construction does not develop any tracking even under a surface discharge which, though rarely, occurs during long applications and moisture and sometimes contaminants on the surface are removed by discharge, thereby preventing breakdown under discharge.

DESCRIPTION OF THE PREFERRED EMBODIMENTS

Figure 1:
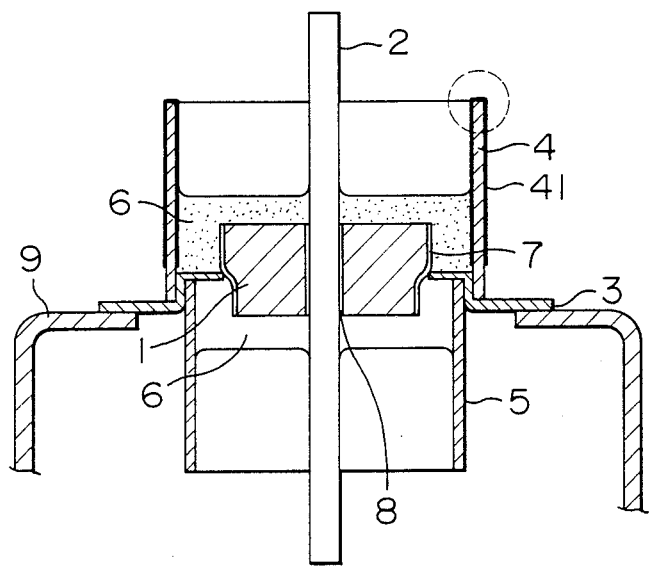
FIG. 1 is a longitudinal sectional view showing a construction of a through-type capacitor according to the present invention.

In FIG. 1 a ceramic dielectric member 1 made of, for example, strontium titanate is substantially cyclindrically formed and has a through hole at the central part thereof into which a central conductor 2 is inserted. The inner peripheral part of the through hole and the outer peripheral part of the dielectric member 1 have the surfaces thereof formed with electrodes 7 and 8 respectively by nickel plating. The central conductor 2 is connected with the electrode 8 by solder. The electrode 7 is soldered with an earth electrode plate 3. The earth electrode 3 has a section bent in crank form as shown, on which cylindrical armor cases 4, 5 of PBT insulating material are fitted from upper and lower sides thereof. One end of the armor case 4 fitted with the earth electrode 3 and the other end thereof including the surrounding areas are coated with a film 41 of anti-tracking resin as shown in FIG. 1. Further, in order to improve the insulation, the insulating resin 6 is filled and solidified in the space between the dielectric member 1 and the armor case thereby to form a through-type capacitor. In the case of through-type capacitor used for the filter of the magnetron, the earth electrode 3 of the capacitor is connected to a filter case 9. As a result, the lower part of FIG. 1 makes up an interior and the upper part thereof an exterior of the filter case. A tracking is liable to occur on the exterior of the filter case which is directly exposed to the external environments. While in the example under consideration, only the armor case 4 is coated with an anti-tracking resin film, tracking becomes harder to develop if the armor case 5 is also coated with an anti-tracking film.

As an anti-tracking resin, the simple substance of insulating epoxy resin, for example, has a considerable anti-tracking property. The anti-tracking property is much more improved if such an inorganic material as aluminum hydroxide or magnesium hydroxide is added to the epoxy resin. One of the reasons for this is probably that the water in crystals or water content generated by decomposition of the hydroxyl group in the aluminum hydroxide or magnesium hydroxide under discharge is evaporated during discharge, and the water content thus evaporated cools the discharge path thereby to prevent an organic material making up an insulating material from being decomposed and generating carbon. A second probable reason is that the water generated and the decomposed organic material change into carbon monoxide or volatile hydrocarbon with the alumina or magnesia produced by decomposition of the hydroxyl group as a catalyst and evaporate. Anyway, even if an insulating organic material is decomposed by discharge, free carbon does not remain on the surface, thereby improving the anti-tracking performance. The amount of aluminum hydroxide or magnesium hydroxide to be added to the epoxy resin should be selected in the range from 30% to 80%, or preferably from 50% to 60% by weight.

Further, the epoxy resin dried by heat is superior in withstanding voltage characteristic to the one dried naturally. As a method for coating epoxy resin film on the armor case, the fluidized powder immersion process disclosed in "The Epoxy Resin", Kuniyuki Hashimoto, published by Nikkan Kogyo Shimbun Shya, 1969, pp. 302-307 is recommended. In this method, a heated armor case 4 is immersed in epoxy resin in powder form to fuse the epoxy resin thereon thereby to form a film 41. Other well-known methods of forming a resin film may also be applied to the present invention with equal effect.

Apart from the aforementioned embodiments in which a through-type capacitor is constructed of electrodes on the inner and outer peripheral surfaces of a cylindrical dielectric member, the present invention is also applicable to a through-type capacitor with electrodes formed on the upper and lower sides of a dielectric member or a through-type capacitor having a plurality of central conductors passing through a dielectric member with equal effect.

Figure 2:
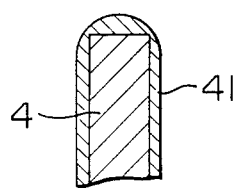
FIG. 2 is an enlarged sectional view of the encircled part of the forward end of an armor case of the through-type capacitor shown in FIG. 1.
Figure 3:
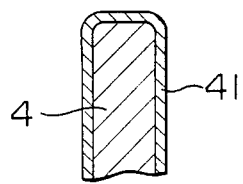
FIG. 3 enlarged sectional view of the encircled part of the forward end of an armor case in FIG. 1 according to another embodiment of the invention.

The forward end of the armor case 4 shown in FIG. 2 has a rectangular section. If the surfaces of this case are formed with an epoxy resin film, the resin film at the corner of the forward end of the armor case 4 would be thinner than the other parts. This is undesirable if a discharge or a tracking is to be prevented. It is therefore recommended that the section of the forward end of the armor case 4 is formed into a smooth curved, for instance semicircular or bevelled form as shown in FIG. 3. This is also the case with the armor case 5.

I claim:
1. A through-type capacitor comprising:
   a central conductor to be applied with a predetermined high potential;
   a dielectric member with the central conductor passing through the center thereof, the central conductor forming an electrode;
   another electrode arranged on the outer periphery of the dielectric member, the dielectric member and the electrodes making up a capacitor;
   a conductor plate connected to the other electrode to apply a predetermined low potential to the other electrode while at the same time coupling the dielectric member with an external member;
   a housing of an insulating material fitted on the conductor plate in a manner to surround the outer periphery of the dielectric member and having an opening along the axial direction of the central conductor;
   an insulating resin filled in a space between the housing and the dielectric member; and
   an anti-tracking resin film of an insulating material coated on the surface of the end of at least an opening of the housing of insulating material and on the inner and outer surfaces of the housing of insulating material adjacent to said end, said anti-tracking resin film having a higher anti-tracking performance than the housing of insulating material.

2. A through-type capacitor according to claim 1, wherein the section along the axis of the central conductor at the edges of the opening of the housing of insulating material is curved or bevelled.

3. A through-type capacitor according to claim 2, wherein the anti-tracking resin of insulating material is made of selected one of aluminum hydroxide and magnesium hydroxide added to epoxy resin.

4. A through-type capacitor according to claim 1, wherein the anti-tracking resin of insulating material is made of selected one of aluminum hydroxide and, magnesium hydroxide added to epoxy resin.

* * * * *